United States Patent [19]

McFarlane et al.

[11] Patent Number: 5,354,230
[45] Date of Patent: Oct. 11, 1994

[54] FOOD PROCESSING SYSTEM WITH SIMPLIFIED LOADING AND TRANSFER

[75] Inventors: Claude L. McFarlane, Madison; David E. Lukens, Lodi, both of Wis.

[73] Assignee: DEC International, Madison, Wis.

[21] Appl. No.: 99,735

[22] Filed: Jul. 30, 1993

[51] Int. Cl.⁵ ............................................. A22C 15/00
[52] U.S. Cl. ..................................... 452/51; 452/182; 452/186; 211/113
[58] Field of Search .................... 452/51, 186, 182; 211/113

[56] References Cited

U.S. PATENT DOCUMENTS

| | | | |
|---|---|---|---|
| 650,877 | 6/1900 | Taliaferro | 452/186 |
| 1,585,234 | 5/1926 | Cowley | 452/186 |
| 2,708,999 | 5/1955 | Rush | 452/186 |
| 3,594,858 | 7/1971 | Simonsen | 452/51 |
| 3,732,971 | 5/1973 | Simonsen | 452/186 |
| 3,792,508 | 2/1974 | Simonsen et al. | 452/51 |
| 3,982,300 | 9/1976 | Soikie et al. | 452/186 |
| 4,322,874 | 4/1982 | Buller-Colthurst | 452/186 |
| 4,540,094 | 9/1985 | Norrie et al. | 452/186 |
| 4,838,036 | 6/1989 | Norrie | 211/113 |
| 5,067,620 | 11/1991 | Norrie | 211/113 |
| 5,082,419 | 1/1992 | Kollross et al. | 452/51 |

*Primary Examiner*—Willis Little
*Attorney, Agent, or Firm*—Andrus, Sceales, Starke & Sawall

[57] ABSTRACT

A food processing system (10) includes a first conveyor (12) having sprocket driven chains (14 and 16) extending along a loading run (26) and a return run (28) at a loading station (80). A support bar (52) extends transversely between the chains (14 and 16), and has a first movable hook (62) and a second stationary hook (64) mounted thereto. A food stick (74) for supporting a food product (76), such as a string of hot dogs, has a leading end (72) engageable with the movable first hook (62) for manually pushing the first hook along the support bar, and a trailing end (82) engageable with the stationary second hook. A second conveyor (102) at a transfer station (114) has spaced parallel sprocket driven chains (104 and 48) for transporting the food stick (74) and food product (76) to a processing station for cooking, smoking, chilling, etc. A transfer assembly (112) at the transfer station (114) engages the food stick (74) during advancement of the first conveyor (12) and transfers the food stick (74) to catches (108 and 110) on the chains (104 and 48) of the second conveyor (102). A return guide rail (88) along the return run (28) of the first conveyor (12) extends diagonally relative to the transverse extension of the support bar (52). During the return run of the first conveyor, the movable hook (62) engages the return guide rail (88) and is slid thereby along the support bar (52) toward the stationary hook (64) such that the movable hook (62) is returned to a loading position for the loading run (26).

16 Claims, 4 Drawing Sheets

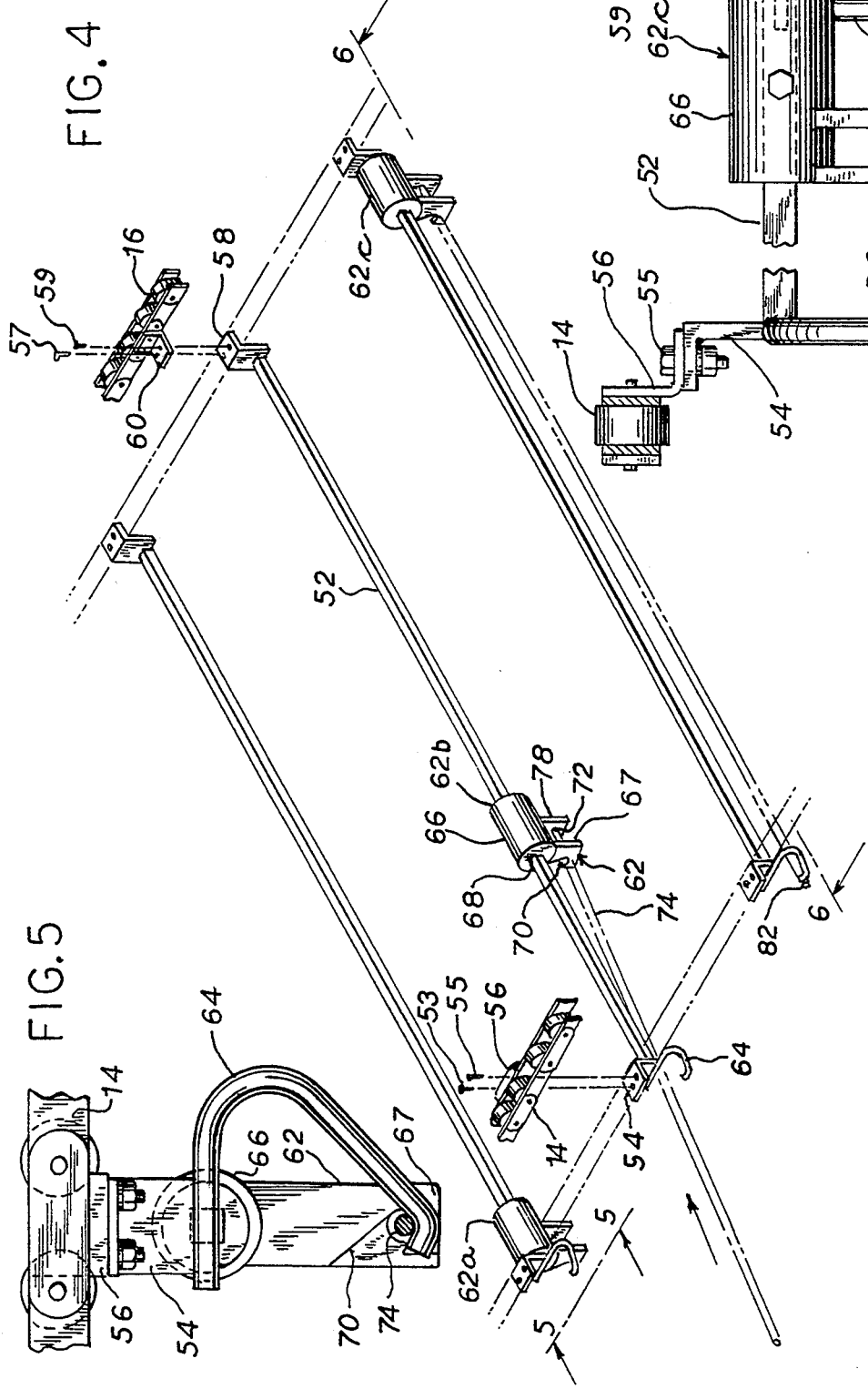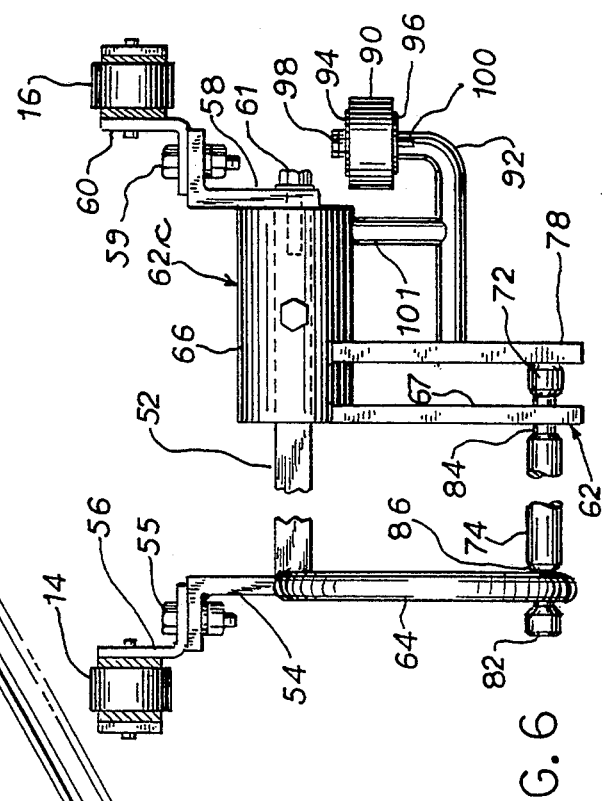

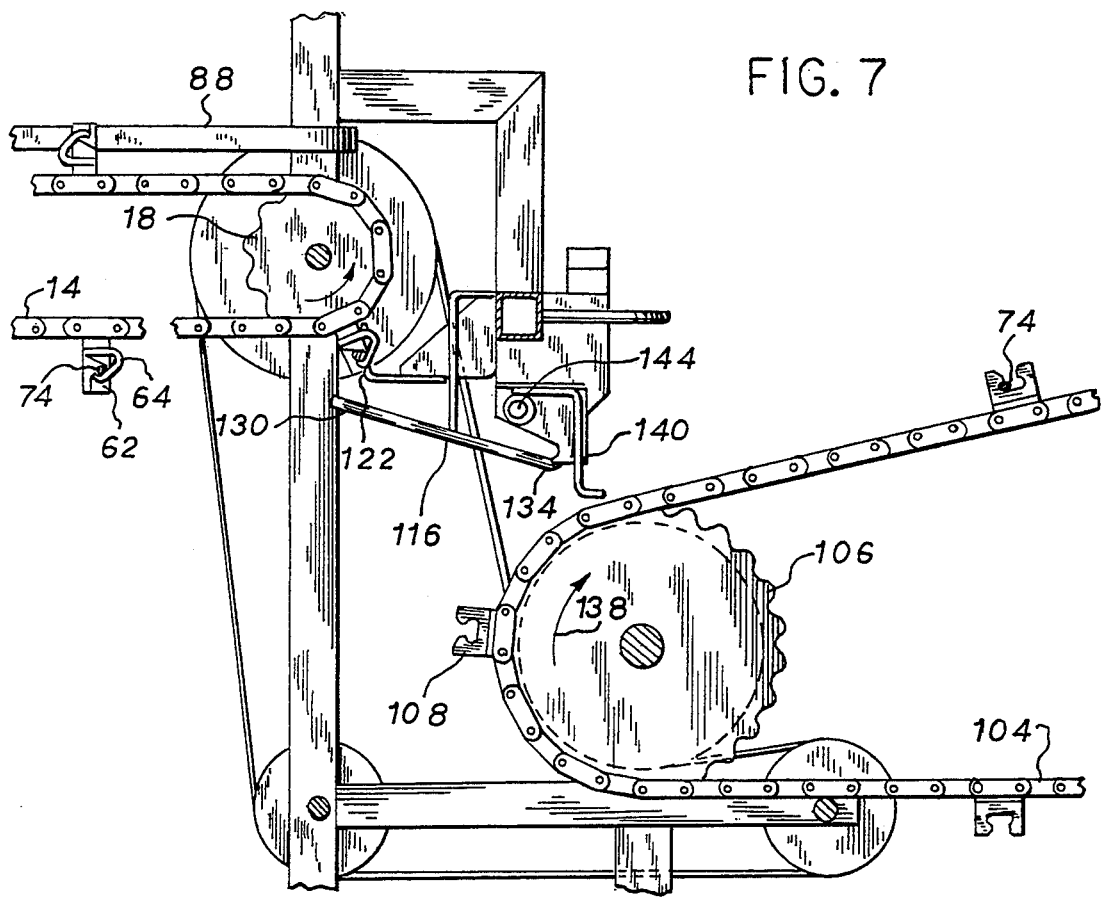
FIG. 7
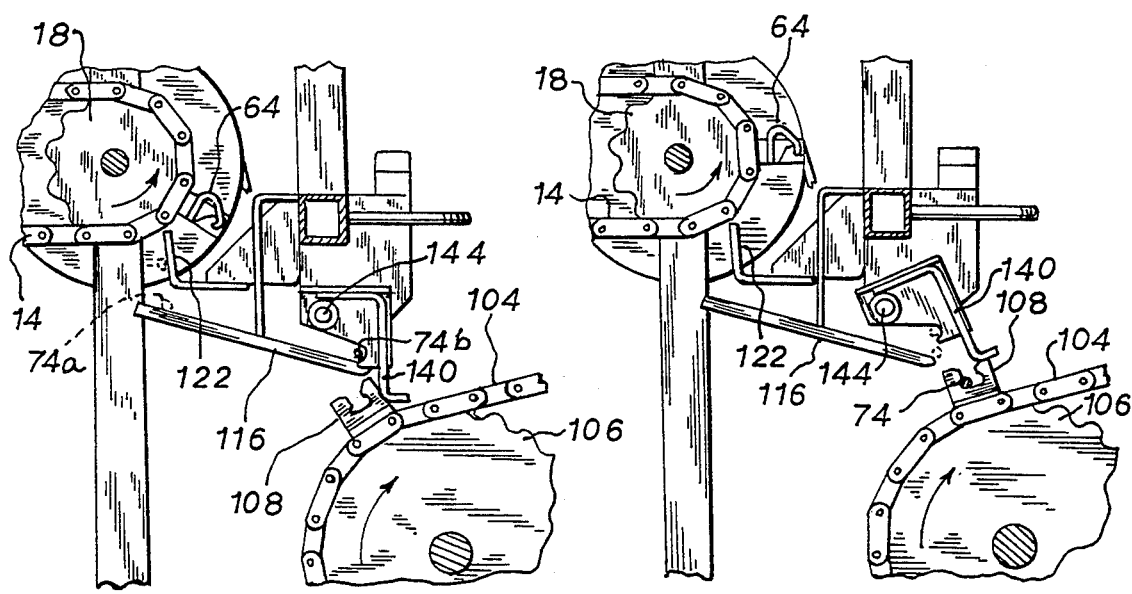
FIG. 8
FIG. 9

FOOD PROCESSING SYSTEM WITH SIMPLIFIED LOADING AND TRANSFER

BACKGROUND AND SUMMARY

The invention relates to a food processing system, including a system for cooking and/or smoking and/or chilling strings of hot dogs or sausages.

In a hot dog processing system, a plurality of strings of hot dogs are manually hung from a meat stick by an operator, and then loaded by the operator onto a conveyor system which transports the hot dogs through one or more designated processing chambers for cooking, smoking, chilling or the like. The meat stick may be transferred from one conveyor to another for passage from one part of a system to another, for example for transfer from a loading station to one or more processing stations.

The present invention provides a simplified loading system for loading the food stick, with the food product suspended therefrom, onto the conveyor at the loading station. The loading operation is simple and quick, and allows a plurality of operators to work at the loading station and load food sticks onto the conveyor, without congestion. This increases productivity. The ease of loading also streamlines an otherwise labor intensive operation, reducing cost.

In another aspect of the invention, the food stick is not captive to the conveyor, and can be easily removed in the event any of the packaging or processing lines break down. The easy removal enables the food product to be readily detached from the conveyor for temporary storage in a cooler, without spoilage, until the system is back up and running.

In another aspect of the invention, the easy loading system is further designed to enable and cooperate with a simple reliable transfer system for transferring the food stick, with the product suspended therefrom, from the loading station conveyor to another conveyor for transport to a processing station.

In another aspect of the invention, an automatic return guide is provided along the return run of the loading system conveyor such that after the food stick is transferred from the loading station conveyor to the downstream processing conveyor, the suspension system on the loading station conveyor is automatically returned to a loading condition for the operator to load a new food stick thereon.

BRIEF DESCRIPTION OF THE DRAWINGS

FIG. 4 is an exploded perspective view of a portion of the system of FIG. 1.

FIG. 5 is a view taken along line 5—5 of FIG. 4.

FIG. 6 Is a view taken along line 6—6 of FIG. 4.

FIG. 7 is a side view of a portion of the system of FIG. 1.

FIGS. 8 and 9 are like FIG. 7 and illustrate sequential operation.

DETAILED DESCRIPTION

Figure 1:
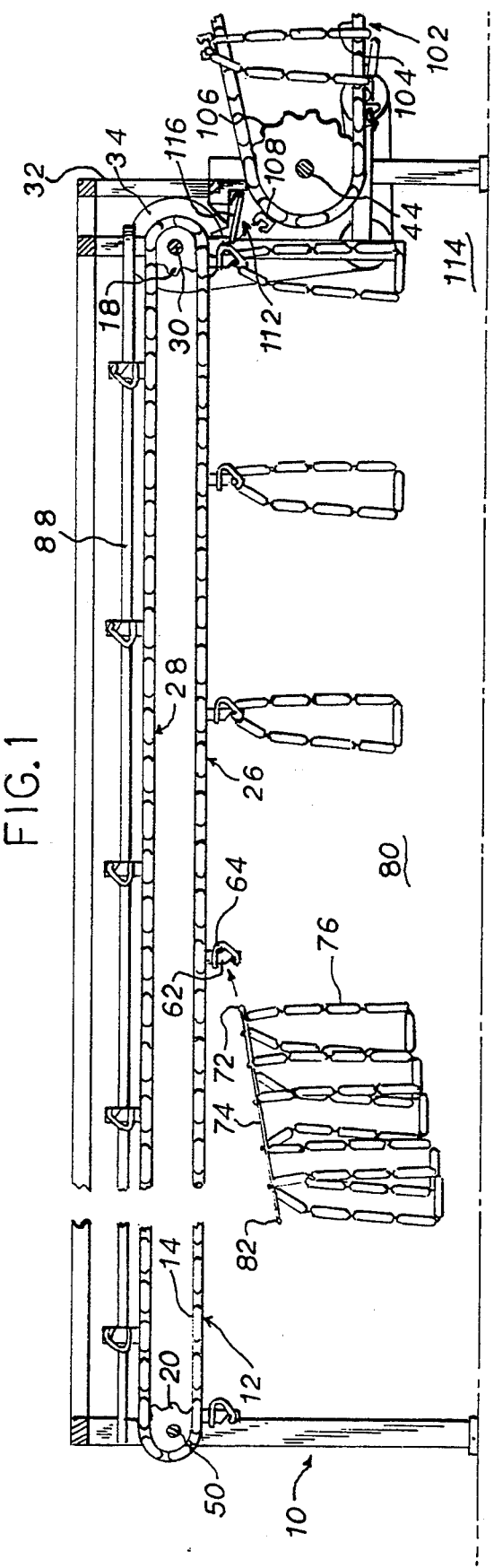
FIG. 1 is a side elevation view of a food processing system in accordance with the invention.
Figure 2:
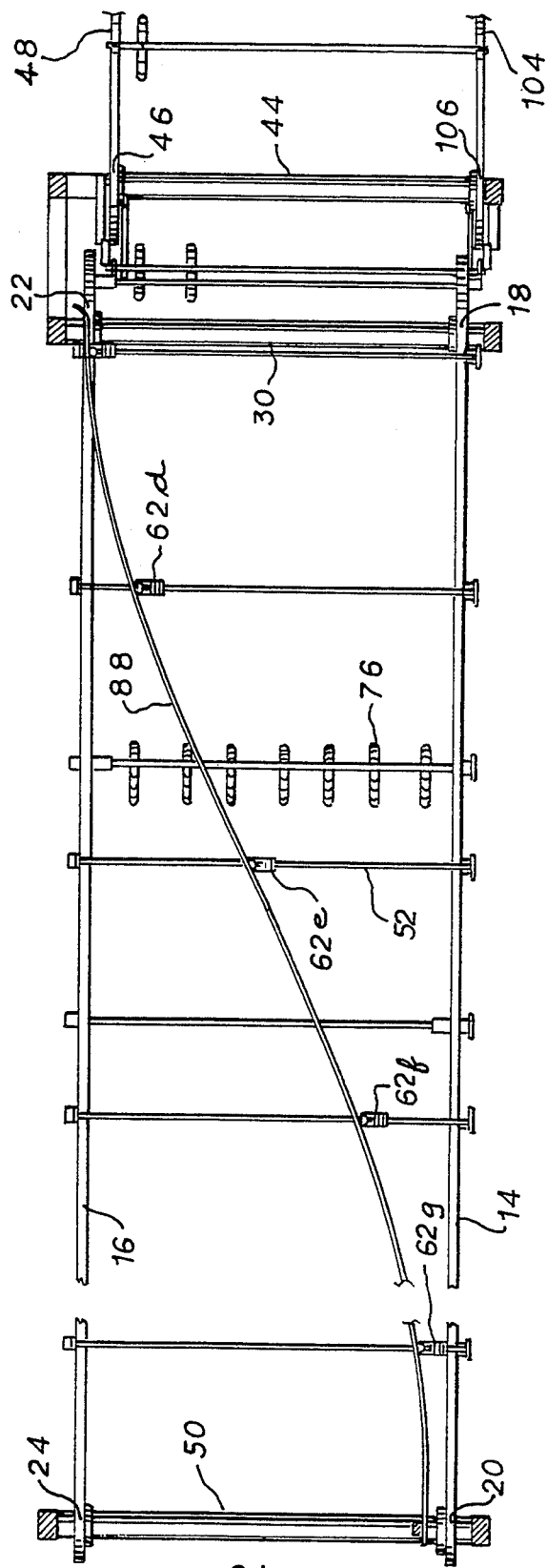
FIG. 2 is a top view of the system of FIG. 1.
Figure 3:
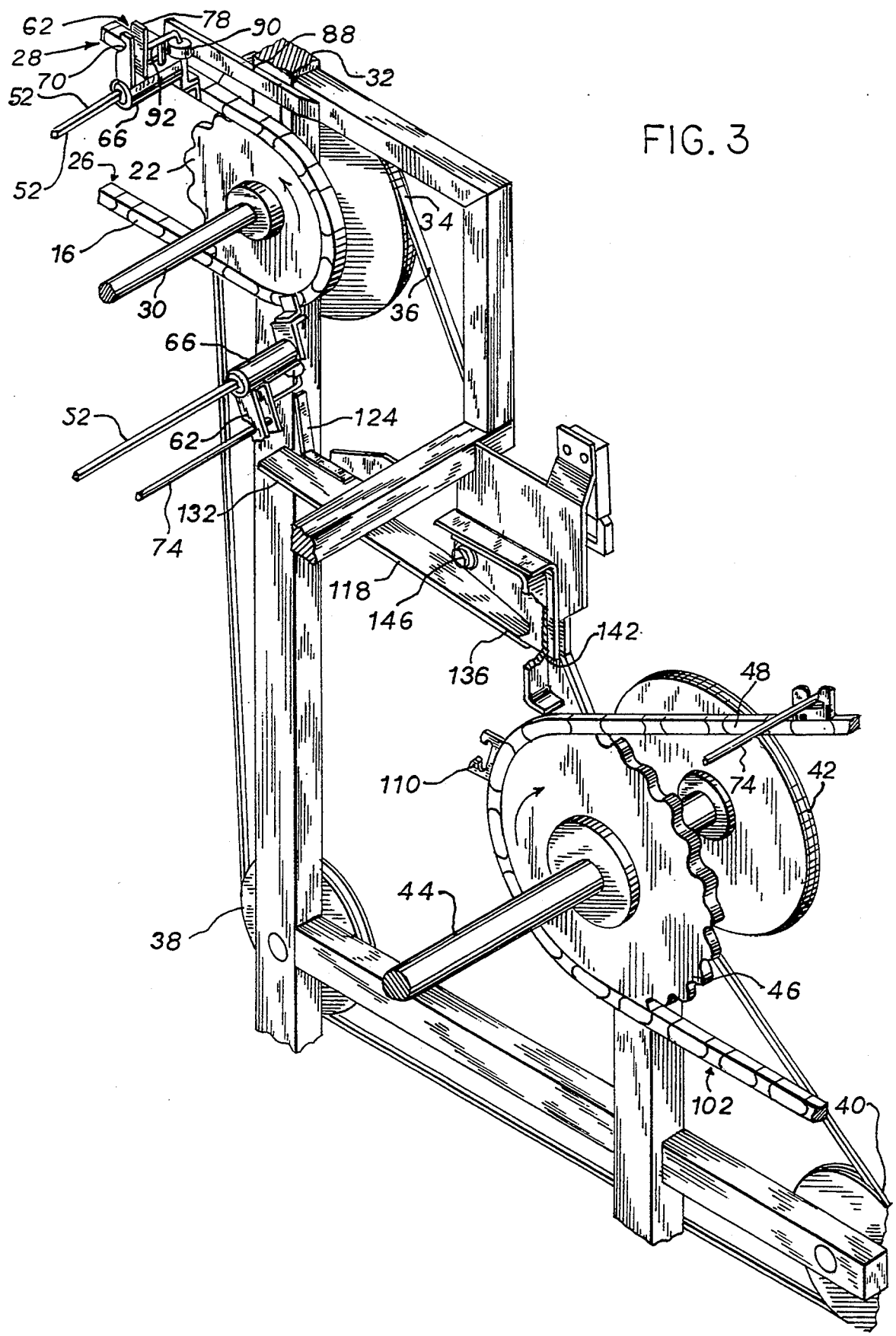
FIG. 3 is a perspective view of a portion of the system of FIG. 1.

FIG. 1 shows a food processing system 10 including a continuous conveyor 12 having first and second parallel spaced chains 14 and 16, FIGS. 2 and 4, engaging spaced sprockets 18 and 22, and 20 and 24, and extending along a lower loading run 26 moving left to right in FIG. 1, and an upper return run 28 moving right to left in FIG. 1. Sprockets 18 and 22, FIGS. 1 and 3, are on axle 30 mounted to support frame 32 and driven by pulley 34, FIG. 3, which is driven by drive belt 36 extending around idler pulleys 38 and 40 and driven by drive pulley 42 on drive shaft 44 which in turn is driven by a second downstream conveyor 102, to be described, including sprocket 46 and chain 48, which in turn is driven by a downstream drive motor or the like (not shown). Sprockets 20 and 24 are on axle 50 mounted to the frame.

A plurality of support bars such as 52, FIG. 4, are mounted to chains 14 and 16 and extend transversely therebetween. One end of support bar 52 has a bracket 54 welded thereto. Bracket 54 is mounted by bolts 53 and 55 to bracket 56 which is pinned or welded to a link of chain 14. The other end of support bar 52 has a bracket 58 mounted thereto by bolt 61, FIG. 6. Bracket 58 is mounted by bolts 57 and 59 to bracket 60 which is pinned or welded to a link of chain 16. First and second hooks 62 and 64 are mounted to support bar 52. Hook 62 is slidable along support bar 52 and includes an upper barrel-like portion 66 engaging support bar 52 in keyed relation and slidable therealong. In preferred form, support bar 52 has a square cross section, and barrel portion 66 has a square cross section aperture 68 therethrough which receives support bar 52. This keyed relation prevents rotation of hook 62 about support bar 52.

Hook 62 includes a depending flange 67 welded to barrel 66 and having a slot or cut-out 70 for receiving the leading end 72 of a food stick 74 upon which the food product is hung, for example plural strings of hot dogs 76, FIG. 1. Another depending flange 78, FIG. 4, is welded to barrel 66 and provides a stop engaged by leading end 72 of food stick 74. The operator at the loading station 80, FIG. 1, engages the leading end 72 of food stick 74 with hook 62 at slot 70 of flange 67 until stopped against flange 78, and pushes the food stick to in turn push hook 62 toward chain 16, FIG. 4, and away from chain 14 and hook 64. The loading of food stick 74 and the pushing of hook 62 in sliding relation along support bar 52 toward chain 16 is shown at sequential positions 62a, 62b, 62c in FIG. 4.

The trailing end 82 of the food stick is then engaged with hook 64, FIG. 4, such that food stick 74 is suspended from hooks 62 and 64. Hook 64 is stationary relative to support bar 52, and preferably support bar 52 and hook 64 are welded to bracket 54, FIG. 6. Food stick 74 has detents 84 and 86 at leading and trailing ends 72 and 82, respectively, and engages respective hooks 62 and 64 in detent relation to maintain the hooks in spaced relation along support bar 52 after hook 62 has been slid toward chain 16, FIGS. 6 and 4.

A return guide 88, FIGS. 2 and 3, is provided by a rail along upper return run 28, FIG. 1, of the conveyor and extends diagonally, FIG. 2, relative to the transverse extension of support bar 52 between chains 14 and 16. During the return run, i.e. right to left movement of the chains along upper return 28 in FIG. 1, hook 62 engages return guide rail 88 and is slid thereby along support bar 52 toward chain 14 as chains 14 and 16 and support bar 52 advance right to left along return run 28. This automatic return movement of hook 62 is shown at sequential positions 62d, 62e, 62f, 62g in FIG. 2. Hook 62 is thus returned to a loading position at 62g adjacent chain 14 for the loading run 26, FIG. 1.

Hook 62 has a roller 90, FIGS. 3 and 6, attached thereto and engaging and rolling along return guide rail 88 during return run 28. Roller 90 rotates on an arm 92 between retaining washers 94 and 96, FIG. 6, held in place by cotter pins 98 and 100. Arm 92 is welded to flange 78 and arm 101 which is welded to barrel 66.

A second conveyor 102, FIG. 1, includes a pair of parallel spaced chains 104 and 48, FIG. 2, engaging spaced sprockets 106 and 46 on drive shaft 44. A pair of spaced catches 108 and 110, FIGS. 1 and 3, are mounted to respective chains 104 and 48. A transfer assembly 112 at transfer station 114 engages food stick 74 during advancement of chains 14 and 16 of the first conveyor 12 and transfers food stick 74 to catches 108 and 110 on chains 104 and 48 of the second conveyor 102.

Transfer assembly 112 includes a pair of transfer slide bars 116 and 118, FIGS. 1, 3, 7, mounted to the supporting frame and adjacent and below respective sprockets 18 and 22 of first conveyor 12. Food stick 74 falls off hooks 62 and 64 and onto transfer slide bars 118 and 116 as hooks 62 and 64 move around sprockets 22 and 18 of first conveyor 12 and are tilted thereby to a position releasing food stick 74, as shown in the sequence from FIG. 7 to FIG. 8. The food stick then slides down the transfer slide bars as shown in FIG. 8 from position 74a to position 74b. In the preferred embodiment, the transfer assembly further includes a pair of kicker blocks 122 and 124 mounted to the frame and engaging food stick 74 near respective trailing and leading ends 82 and 72 as hooks 64 and 62 advance around sprockets 18 and 22 of the first conveyor 12, such that the kicker blocks strike and positively mechanically push food stick 74 off of hooks 64 and 62 as the hooks tilt, FIGS. 7-9, during their advancement around sprockets 18 and 22.

Transfer slide bars 116 and 118 have respective first ends 130 and 132 adjacent respective hooks 64 and 62 of first conveyor 12. Transfer slide bars have respective second ends 134 and 136 adjacent respective catches 108 and 110 on respective chains 104 and 48 of the second conveyor 102. Each catch 108 and 110 advances upwardly as shown at arrow 138, FIG. 7, around its respective sprocket 106 and 46, and engages food stick 74 at second ends 134 and 136 of respective transfer slide bars 116 and 118. The transfer assembly includes a pair of transfer hooks 140 and 142 pivoted to the frame at respective pivot pins 144 and 146 adjacent respective second ends 134 and 136 of respective transfer slide bars 116 and 118 and holding food stick 74 at such second ends 134 and 136. During advance of chains 104 and 48 of second conveyor 102, catches 108 and 110 engage and pivot respective transfer hooks 140 and 142 to release food stick 74 from transfer slide bars 116 and 118 to respective catches 108 and 110, FIGS. 8 and 9.

It is recognized that various equivalents, alternatives and modifications are possible within the scope of the appended claims.

We claim:

1. A food processing system comprising a continuous conveyor having first and second spaced chains engaging spaced sprockets and extending along a loading run and a return run, a support bar mounted to said chains and extending transversely therebetween, first and second hooks mounted to said support bar, said first hook being slidable along said support bar, a food stick for supporting a food product, said food stick having a first end engageable with said first hook for pushing said first hook toward said first chain and away from said second hook, said food stick having a second end engageable with said second hook, such that said food stick is suspended from said first and second hooks.

2. The food processing system according to claim 1 comprising a return guide along said return run and extending diagonally relative to the transverse extension of said support bar between said chains such that during said return run said first hook engages said return guide and is slid thereby along said support bar toward said second chain as said chains and said support bar advance along said return run, such that said first hook is returned to a loading position for said loading run.

3. The food processing system according to claim 2 wherein said first hook has a roller attached thereto and engaging and rolling along said return guide during said return run.

4. The food processing system according to claim 1 wherein said support bar and said first hook engage in keyed relation to prevent rotation of said first hook about said support bar.

5. The food processing system according to claim 1 wherein said support bar engages each of said hooks in detent relation to maintain said hooks in spaced relation along said support bar after said first hook has been slid toward said first chain.

6. The food processing system according to claim 1 wherein said second hook is stationary relative to said support bar.

7. A food processing system comprising a first conveyor having a pair of spaced chains engaging spaced sprockets, a support bar mounted to said chains and extending transversely therebetween, a pair of hooks mounted to said support bar, a food stick hanging from said hooks, a second conveyor having a pair of spaced chains engaging spaced sprockets, a pair of spaced catches each mounted to a respective chain of said second conveyor, a transfer assembly engaging said food stick during advancement of said chains of said first conveyor and transferring said food stick to said catches of said second conveyor.

8. The food processing system according to claim 7 wherein said transfer assembly comprises a pair of transfer slide bars adjacent said sprockets of said first conveyor, and wherein said food stick falls off said hooks and onto said transfer slide bars as said hooks move around said sprockets of said first conveyor and are tilted thereby to a position releasing said food stick.

9. The food processing system according to claim 8 wherein said transfer assembly comprises a pair of kicker blocks engaging said food stick as said hooks advance around said sprockets of said first conveyor, such that said kicker blocks strike and positively mechanically push said food stick off of said hooks as said hooks tilt during their advancement around said sprockets of said first conveyor.

10. The food processing system according to claim 8 wherein each of said transfer slide bars has a first end adjacent a respective said hook of said first conveyor, and a second end adjacent a respective said catch of said second conveyor, wherein each said catch advances upwardly around its respective sprocket and engages said food stick at said second end of said transfer slide bar.

11. The food processing system according to claim 10 wherein said transfer assembly comprises a pair of pivoted transfer hooks adjacent said second end of respective said transfer slide bars and holding said food stick at said second end, wherein during advance of said chains of said second conveyor said catches engage and pivot said transfer hooks to release said food stick to said catches.

12. A food processing system comprising:
a first conveyor having first and second spaced chains engaging spaced sprockets and extending along a loading run and a return run;
a support bar mounted to said first and second chains and extending transversely therebetween;
first and second hooks mounted to said support bar, said first hook being slidable along said support bar;
a food stick for supporting a food product, said food stick having a first end engageable with said first hook for pushing said first hook toward said first chain and away from said second hook, said food stick having a second end engageable with said second hook, such that said food stick is suspended from said first and second hooks;
a second-conveyor having third and fourth spaced chains engaging spaced sprockets;
first and second spaced catches each mounted to a respective said third and fourth chain;
a transfer assembly engaging said food stick during advancement of said first and second chains of said first conveyor and transferring said food stick to said first and second catches of said second conveyor.

13. The food processing system according to claim 12 comprising a return guide along said return run and extending diagonally relative to the transverse extension of said support bar between said first and second chains such that during said return run said first hook engages said return guide and is slid thereby along said support bar toward said second chain as said first and second chains and said support bar advance along said return run, such that said first hook is returned to a loading position for said loading run.

14. The food processing system according to claim 12 wherein:
said first hook engages said support bar in keyed relation to prevent rotation of said first hook about said support bar;
said transfer assembly comprises:
a pair of transfer slide bars adjacent said sprockets of said first conveyor, each of said transfer slide bars having a first end adjacent a respective said hook of said first conveyor, and a second end adjacent a respective said catch of said second conveyor;
a pair of kicker blocks engaging said food stick as said hooks advance around said sprockets of said first conveyor and pushing said food stick off of said hooks as said hooks tilt during their advancement around said sprockets of said first conveyor such that said food stick falls off said hooks and onto said transfer slide bars as said hooks move around said sprockets of said first conveyor and are tilted thereby to a position releasing said food stick.

15. The food processing system according to claim 14 wherein said first and second catches advance upwardly around their respective sprockets and engage said food stick at said second end of said transfer slide bar, said transfer assembly comprising a pair of pivoted transfer hooks adjacent said second end of respective said transfer bars and holding said food stick at said second end, wherein during advance of said third and fourth chains by said second conveyor said catches engage and pivot said transfer hooks to release said food stick to said catches.

16. A food processing system comprising:
a first conveyor having first and second spaced chains engaging spaced sprockets and extending along a loading run and a return run;
a support bar mounted to said chains and extending transversely therebetween;
first and second hooks mounted to said support bar, said first hook being slidable along said support bar and keyed thereto to prevent rotation of said first hook about said support bar;
a food stick for supporting a food product, said food stick having a first end engageable with said first hook for pushing said first hook toward said first chain and away from said second hook, said food stick having a second end engageable with said second hook, such that said food stick is suspended from said first and second hooks;
a second conveyor having third and fourth spaced chains engaging spaced sprockets;
first and second spaced catches each mounted to a respective said third and fourth chain;
a transfer assembly engaging said food stick during advancement of said first and second chains of said first conveyor and transferring said food stick to said first and second catches of said second conveyor, said transfer assembly comprising a pair of transfer slide bars adjacent said sprockets of said first conveyor, each of said transfer slide bars having a first end adjacent a respective said hook of said first conveyor, and a second end adjacent a respective said catch of said second conveyor, and a pair of kicker blocks engaging said food stick as said hooks advance around said sprockets of said first conveyor and pushing said food stick off said hooks as said hooks tilt during their advancement around said sprockets of said first conveyor such that said food stick falls off said hooks and onto said transfer slide bars as said hooks move around said sprockets of said first conveyor and are tilted thereby to a position releasing said food stick, wherein said first and second catches advance upwardly around their respective sprockets and engage said food stick at said second end of said transfer slide bars; and
a return guide along said return run and extending diagonally relative to the transverse extension of said support bar between said first and second chains such that during said return run said first hook engages said return guide and is slid thereby along said support bar toward said second chain as said first and second chains and said support bar advance along said return run, such that said first hook is returned to a loading position for said loading run.

* * * * *